United States Patent
Aylward et al.

(10) Patent No.: US 6,268,117 B1
(45) Date of Patent: *Jul. 31, 2001

(54) PHOTOGRAPHIC CLEAR DISPLAY MATERIAL WITH COEXTRUDED POLYESTER

(75) Inventors: Peter T. Aylward, Hilton; Robert P. Bourdelais, Pittsford; Thomas M. Laney, Hilton; Alphonse D. Camp, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/218,147

(22) Filed: Dec. 21, 1998

(51) Int. Cl.$^7$ ................................................ G03C 1/76
(52) U.S. Cl. ........................ 430/533; 430/22; 430/496; 430/536; 430/930
(58) Field of Search .......................... 430/22, 496, 930, 430/536, 533

(56) References Cited

U.S. PATENT DOCUMENTS

| | | |
|---|---|---|
| 4,701,369 | 10/1987 | Duncan . |
| 4,701,370 | 10/1987 | Park . |
| 5,084,334 | 1/1992 | Hamano et al. . |
| 5,141,685 | 8/1992 | Maier et al. . |
| 5,143,765 | 9/1992 | Maier et al. . |
| 5,223,383 | 6/1993 | Maier et al. . |
| 5,275,854 | 1/1994 | Maier et al. . |
| 5,422,175 | 6/1995 | Ito et al. . |
| 5,674,672 | * 10/1997 | Kawamoto ............................ 430/533 |
| 5,853,965 | 12/1998 | Haydock et al. . |
| 5,866,282 | * 2/1999 | Bourdelais et al. ................... 430/22 |
| 5,874,205 | 2/1999 | Bourdelais et al. . |
| 5,945,266 | * 8/1999 | Masvesky et al. ..................... 430/524 |
| 6,030,756 | * 2/2000 | Bourdelais et al. .................. 430/363 |
| 6,080,532 | * 6/2000 | Camp et al. .......................... 430/533 |

FOREIGN PATENT DOCUMENTS

| | | |
|---|---|---|
| 0 470 760 A2 | 2/1992 | (EP) . |
| 0 880 065 A1 | 11/1998 | (EP) . |
| 0 880 067 A1 | 11/1998 | (EP) . |
| 0 880 069 A1 | 11/1998 | (EP) . |
| 2 215 268 | 9/1989 | (GB) . |
| 2 325 749 | 12/1998 | (GB) . |
| 2 325 750 | 12/1998 | (GB) . |

OTHER PUBLICATIONS

Japanese Abstract 85/31669 w/claims.
Japanese Abstract 5,057,836, 1993.
Japanese Abstract 7,137,216, 1995 w/claim.

* cited by examiner

*Primary Examiner*—Janet Baxter
*Assistant Examiner*—Amanda C. Wallace
(74) *Attorney, Agent, or Firm*—Paul A. Leipold

(57) ABSTRACT

This invention relates to a photographic member comprising at least one photosensitive layer and an integral base material comprising at least one polyester layer and an upper surface layer comprising a polyester or polyolefin polymer and a bluing tint wherein said integral base material has a spectral transmission of greater than 90%.

27 Claims, No Drawings

PHOTOGRAPHIC CLEAR DISPLAY MATERIAL WITH COEXTRUDED POLYESTER

FIELD OF THE INVENTION

This invention relates to photographic materials. In a preferred form it relates to base materials for photographic clear display that do not have incorporated diffuser layers.

BACKGROUND OF THE INVENTION

It is known in the art that photographic display materials are utilized for advertising as well as decorative displays of photographic images. Since these display materials are used in advertising, the image quality of the display material is critical in expressing the quality message of the product or service being advertised. Furthermore, a photographic display image needs to be high impact, as it attempts to draw consumer attention to the display material and the desired message being conveyed. Typical applications for display material include product and service advertising in public places such as airports, buses and sports stadiums, movie posters and fine art photography. The desired attributes of a quality, high impact photographic display material are a slight blue density minimum, durability, sharpness and flatness. Cost is also important as display materials tend to be expensive compared with alternative display material technology mainly lithographic images on paper. For display materials, traditional color paper is undesirable as it suffers from a lack of durability for the handling, photographic processing and display of large format images.

In the formation of color paper it is known that the base paper has applied thereto a layer of polymer, typically polyethylene. This layer serves to provide waterproofing to the paper, as well as providing a smooth surface on which the photosensitive layers are formed. The formation of a suitably smooth surface is difficult requiring great care and expense to ensure proper laydown and cooling of the polyethylene layers. The formation of a suitably smooth surface would also improve image quality as the display material would have more apparent blackness as the reflective properties of the improved base are more specular than the prior materials. As the whites are whiter and the blacks are blacker, there is more range in between and, therefore, contrast is enhanced. It would be desirable if a more reliable and improved surface could be formed at less expense.

Prior art photographic reflective papers comprise a melt extruded polyethylene layer which also serves as a carrier layer for optical brightener and other whitener materials as well as tint materials. It would be desirable if the optical brightener and tints, rather than being dispersed a single melt extruded layer of polyethylene could be concentrated nearer the surface where they would be more effective optically.

Prior art photographic clear display materials have light sensitive silver halide emulsions coated directly onto a gelatin coated clear polyester sheet. Clear photographic display materials are typically used as overhead materials that are projected on a screen, typically highly reflective and white and display materials that utilize light boxes with a white diffuser screen. Diffuser screens are necessary to diffuse the light source used to backlight clear display materials and to provide the white portion of the image. Without a diffuser, the light source would significantly reduce the quality of the image. Since light sensitive silver halide emulsions that are used for prior art clear display materials tend to be yellow because of the gelatin used as a binder for photographic emulsions, the minimum density areas of a developed image will tend to appear as a yellow white. A yellow white reduces the commercial value of a transmission display material because the imaging viewing public associates image quality with a blue white. It would be desirable if a clear display material could have a more blue white.

Prior art clear display materials use a high coverage of light sensitive silver halide emulsion coated on one side of the base to increase the density of the image compared to photographic reflective print materials. An increase in dye density is required for clear display materials to provide the required dye density associated with a quality image. While increasing the coverage does increase the density of the image in transmission space, the time to image development is also increased as the coverage increases. Typically, a high density clear display material has a developer time of 110 seconds compared to a developer time of 45 seconds or less for photographic reflective print materials. Prior art high density clear display materials, when processed, reduce the productivity of the development lab. Further, coating a high coverage of emulsion requires additional drying of the emulsion in manufacturing reducing the productivity of emulsion coating machines. It would be desirable if a clear display material was high in dye density to provide a quality image and had a developer time less than 50 seconds.

Prior art photographic display material use polyester as a base for the support. Typically the polyester support is from 150 to 250 $\mu$m thick to provide the required stiffness. A thinner base material would be lower in cost and allow for roll handling efficiency as the rolls would weigh less and be smaller in diameter. It would be desirable to use a base material that had the required stiffness but was thinner to reduce cost and improve roll handling efficiency.

PROBLEM TO BE SOLVED BY THE INVENTION

There is a need for clear display materials that provide improved transmission of light while, at the same time, reducing the yellowness of the density minimum areas of the image.

SUMMARY OF THE INVENTION

It is an object of the invention to provide improved clear display materials.

It is another object to provide display materials that are lower in cost, as well as providing sharp durable images.

It is a further object to provide a clear display materials with a whiter density minimum.

It is an another object to provide a product that may be provided with a silver halide image on each side but still retain a single exposure step and short processing time.

These and other objects of the invention are accomplished by a photographic member comprising at least one photosensitive layer and an integral base material comprising at least one polyester layer and an upper surface layer comprising a polyester or polyolefin polymer and a bluing tint wherein said integral base material has a spectral transmission of greater than 90%.

ADVANTAGEOUS EFFECT OF THE INVENTION

The invention provides whiter images by off setting the yellowness of the light sensitive silver halide emulsion.

DETAILED DESCRIPTION OF THE INVENTION

The invention has numerous advantages over prior clear display materials and methods of imaging transmission display materials. The display materials of the invention provide transmission of a high percentage of the light. The material as it contains in its preferred form silver halide imaging layers on both sides of a polymer sheet that may be imaged by a collimated beam exposure device in a single exposure. As there are two relatively thin layers of silver halide image materials, the developing of the invention element may be carried out rapidly as the penetration of the developing solution is rapid through the thin layers of imaging material. This rapid processing of images allows for efficient and low cost production of overhead slides for sales and business presentations. The materials are low in cost as the transparent polymer material sheet is thinner than in prior products. They are also lower in cost as less gelatin is utilized and no antihalation layer was surprisingly found to be not necessary. The minimum density areas of the clear display material of the invention will appear whiter to the observer than prior art materials which have a tendency to appear somewhat yellow as the light sensitive silver halide emulsions used for clear display materials have a native yellowness. These and other advantages will be apparent from the detailed description below.

The terms as used herein, "top", "upper", "emulsion side", and "face" mean the side or toward the side of the element carrying the biaxially oriented sheet. The terms "bottom", "lower side", and "back" mean the side opposite of the biaxially oriented sheet. The term as used herein, "transparent" means the ability to pass radiation without significant deviation or absorption. For this invention, "transparent" material is defined as a material that has a spectral transmission greater than 90%. For a photographic element, spectral transmission is the ratio of the transmitted power to the incident power and is expressed as a percentage as follows; $T_{RGB}=10^{-D}*100$ where D is the average of the red, green and blue Status A transmission density response measured by an X-Rite model 310 (or comparable) photographic transmission densitometer. The term as used herein, "duplitized" element means elements with light sensitive silver halide coating on the top side and the bottom side of the imaging support.

The layers of the biaxially oriented polymer sheet of this invention have levels of colorants and optical brighteners adjusted to provide optimum transmission properties and color correction for the native yellowness of the gelatin used in silver halide emulsion. A blue tint is added to a thin layer polyolefin layer on the biaxially oriented sheet that corrects the native yellowness of the gelatin. Optical brightener is also added to the thin layer of polyolefin on the biaxially oriented sheet to provide additional blue correction when the display material is illuminated by a light source. The biaxially oriented polymer sheet is coextruded as a multi layer integral substrate of sufficient thickness for stiffness required for efficient image processing as well as product handling and display. An important aspect of this invention is that the photographic member is coated with a light sensitive silver halide emulsion on the top side and the bottom side. This duplitized silver halide coating combined with the optical properties of the biaxially oriented sheet provides an improved photographic display material. The duplitized display material of this invention has significant commercial value in that prior art photographic display materials with emulsion on one side require a developer time of 110 seconds compared to a developer time of 45 seconds for the invention. It has been found that the duplitized emulsion top side to bottom side coverage ratio should be in a range of 1:0.6 to 1:1.25. It has been shown that the duplitized emulsion top side to bottom side coverage ratio of 1:1.25 resulted in significant and adverse attenuation of the imaging light which resulted in under exposure of the bottom side emulsion coating. Conversely, a duplitized emulsion top side to bottom side coverage ratio of less than 1:0.6 resulted in significant and adverse attenuation of the imaging light which resulted in over exposure of the top side emulsion coating. The preferred duplitized emulsion top side to bottom side coverage ratio is 1:1. A 1:1 ratio allows for efficient exposure and the required dye density for a quality image. The imaging element of this invention allows for rapid creation of overhead material common to business and sales presentations that provide film like quality using paper processing chemistry.

Any suitable biaxially oriented polymer sheet may be utilized for the top layer of the invention. The core of the preferred integral sheet should be from 15 to 95% of the total thickness of the sheet, preferably from 30 to 85% of the total thickness. The skin(s) should thus be from 5 to 85% of the sheet, preferably from 15 to 70% of the thickness. The total thickness of the integral sheet can range from 76 to 256 μm, preferably from 76 to 200 μm . Below 76 μm, the biaxially oriented sheet may not be thick enough to minimize any inherent non-planarity in the support and would be more difficult to manufacture. At thickness higher than 256 μm, little improvement in either surface smoothness or mechanical properties are seen, and so there is little justification for the further increase in cost for extra materials. In the preferred embodiment a photographic member comprising at least one photosensitive layer and an integral base material comprising at least one polyester layer and an upper surface layer comprising a polyester or polyolefin polymer and a bluing tint wherein said integral base material has a spectral transmission of greater than 90% and an imaging member that has a thickness of between 76 and 256 μm.

For the biaxially oriented sheet, suitable classes of thermoplastic polymers for the biaxially oriented sheet and the core matrix-polymer of the preferred composite sheet comprise polyesters. Suitable polyester include polyethylene terephthalate, modified polyethylene terephthalate, polybutylene terephthalate, copolyester such as poly(1,4-cyclohexylene dimethylene) terepbthalate. Suitable polyolefins include polypropylene, polyethylene, polymethylpentene, polystyrene, polybutylene and mixtures thereof.

The skin layers of the composite sheet can be made of polyolefin materials such as polyolefin copolymers, including copolymers of propylene and ethylene such as hexene, butene, and octene are also useful. Polyethylene is preferred, as it is low in cost and has desirable strength properties and generally has excellent adhesion to gelatin based light sensitive emulsions.

The total thickness of the top most skin layer of the biaxially oriented sheet of this invention should be between 0.20 μm and 1.5 μm, preferably between 0.5 and 1.0 μm. Below 0.5 μm any inherent non-planarity in the coextruded skin layer may result in unacceptable color variation. At skin thickness greater than 1.0 μm, there is a reduction in the photographic optical properties such as image resolution. At thickness greater that 1.0 μm there is also a greater material volume to filter for contamination such as clumps, poor color pigment dispersion, or contamination. Low density polyethylene with a density of 0.88 to 0.94 g/cc is the preferred material for the top skin because current emulsion formulation adhere well to low density polyethylene compared to other materials such as polypropylene and high density polyethylene.

Addenda may be added to the top most skin layer to change the color of the imaging element. For photographic use, a clear base with a slight bluish tinge is preferred. The addition of the slight bluish tinge may be accomplished by any process which is known in the art including the machine blending of color concentrate prior to extrusion and the melt extrusion of blue colorants that have been pre-blended at the desired blend ratio. Colored pigments that can resist extrusion temperatures greater than 320° C. are preferred as temperatures greater than 320° C. are necessary for coextrusion of the skin layer. Blue colorants used in this invention may be any colorant that does not have an adverse impact on the imaging element Preferred blue colorants include Phthalocyanine blue pigments, Cromophtal blue pigments, Irgazin blue pigments, Irgalite organic blue pigments and pigment Blue 60.

It has been found that a very thin polyolefin layer (0.2 to 1.5 μm) on the surface immediately below the emulsion layer can be made by coextrusion and subsequent stretching in the width and length direction. It has been found that this polyolefin layer is, by nature, extremely accurate in thickness and when blue tints are added, can be used to provide all the color corrections which are usually distributed throughout the thickness of the sheet between the emulsion and the transparent base. This topmost layer is so efficient that the total colorants needed to provide a correction are less than one-half the amount needed if the colorants are dispersed throughout thickness of the biaxially oriented sheet. Colorants are often the cause of spot defects due to clumps and poor dispersions. Spot defects which are defects that can cause undesirable density differences in the developed image, decrease the commercial value of images. The spot defects are improved with this invention because less colorant is used and high quality filtration to clean up the colored layer is much more feasible since the total volume of polymer with colorant is only typically 2 to 10 percent of the total polymer between the base paper and the photosensitive layer.

Addenda may be added to the biaxially oriented sheet of this invention so that when the biaxially oriented sheet is viewed by the intended audience, the imaging element emits light in the visible spectrum when exposed to ultraviolet radiation. Emission of light in the visible spectrum allows for the support to have a desired background color in the presence of ultraviolet energy. This is particularly useful when images are backlit with a light source that contains ultraviolet energy and may be used to optimize image quality for transmission display applications.

Addenda known in the art to emit visible light in the blue spectrum are preferred. Consumers generally prefer a slight blue tint to white defined as a negative b* compared to a white defined as a b* within one b* unit of zero. b* is the measure of yellow/blue in CIE space. A positive b* indicates yellow while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is illuminated ultraviolet light source and a light source without any significant ultraviolet energy. Delta b* is the preferred measure to determine the net effect of adding an optical brightener to the top biaxially oriented sheet of this invention. Emissions less than 1 b* unit can not be noticed by most customers therefore is it not cost effective to add optical brightener to the biaxially oriented sheet. An emission greater that 5 b* units would interfere with the color balance of the prints making the whites appear too blue for most consumers.

The preferred addenda to a photographic member comprising at least one photosensitive layer and an integral base material comprising at least one polyester layer and an upper surface layer comprising a polyester or polyolefin polymer and a bluing tint wherein said integral base material has a spectral transmission of greater than 90% is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4Bis(O-Cyanostyryl) Benzol and 2-Amino-4-Methyl Phenol. An unexpected desirable feature of this efficient use of optical brightener is explained as follows: because the ultraviolet source for a transmission display material is on the opposite side of the image, the ultraviolet light intensity is not reduced by ultraviolet filters common to imaging layers. The result is less optical brightener is required to achieve the desired background color.

The optical brightener may be added to any layer in the multilayer coextruded biaxially oriented polymer sheet. The preferred location is adjacent to or in the exposed surface layer of said sheet. This allows for the efficient concentration of optical brightener which results in less optical brightener being used when compared to traditional photographic supports. When the desired weight % loading of the optical brightener begins to approach the concentration at which the optical brightener migrates to the surface of the support forming crystals in the imaging layer, the addition of optical brightener into the layer adjacent to the exposed layer is preferred. In this case, the migration from the layer adjacent to the exposed layer is significantly reduced allowing for much higher optical brightener levels to be used to optimize image quality. Locating the optical brightener in the layer adjacent to the exposed layer allows for a less expensive optical brightener to be used as the exposed layer, which is substantially free of optical brightener, prevents significant migration of the optical brightener. Another preferred method to reduce unwanted optical brightener migration is to use polypropylene for the layer adjacent to the exposed surface. Since optical brightener is more soluble in polypropylene than polyethylene, the optical brightener is less likely to migrate from polypropylene.

A photographic member comprising at least one photosensitive layer and an integral base material comprising at least one polyester layer and an upper surface layer comprising a polyester or polyolefin polymer and a bluing tint wherein said integral base material has a spectral transmission of greater than 90% should be substantially free of inorganic pigments such as white pigments. White pigments such as $TiO_2$ or colorants with large particles added to the polymer sheet tend to scatter light and reduce the spectral transmission of the support. Light scattering and a reduction in spectral transmission are undesirable for a clear display materials. Small amounts of tints and optical brighteners may be added but care needs to be taken to prevent unwanted light scattering.

The preferred spectral transmission of the imaging element of this invention is at least 90%. Spectral transmission is the amount of light energy that is transmitted through a material. For a photographic element, spectral transmission is the ratio of the transmitted power to the incident power and is expressed as a percentage as follows; $T_{RGB}=10^{-D}*100$ where D is the average of the red, green and blue Status A transmission density response measured by an X-Rite model 310 (or comparable) photographic transmission densitometer. The higher the transmission, the less opaque the material. For a clear display material, the quality of the image is related to the amount of light transmitted through the image. A clear display image with a low amount of spectral transmission does not allow sufficient illumination of the image causing a perceptual loss in image quality. A transmission image with a spectral transmission of less than 85% is unacceptable for a clear display material as the quality of the image can not match prior art clear display materials.

The most preferred spectral transmission density for the imaging element of this invention is between 92% and 98%. This range allows for optimization of transmission properties to create a clear display material that can be used as an overhead or display material in combination with a light box and diffuser screen.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. A stretching ratio, defined as the final length divided by the original length for sum of the machine and cross directions, of at least 10 to 1 is preferred. After the sheet has been stretched, it is heat set by heating to a temperature sufficient to crystallize or anneal the polymers while restraining to some degree the sheet against retraction in both directions of stretching.

The coextruded sheet, while described as having preferably at least two layers, may also be provided with additional layers that may serve to change the properties of the biaxially oriented sheet. Biaxially oriented sheets could be formed with surface layers that would provide an improved adhesion, or look to the support and photographic element. The biaxially oriented extrusion could be carried out with as many as 10 layers if desired to achieve some particular desired property.

These coextruded sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties.

The structure of a preferred biaxially oriented sheet where the exposed surface layer is adjacent to the imaging layer is as follows:

---
Polyethylene skin with blue pigments
Polyester with optical brightener
---

Polyester sheets are particularly advantageous because they provide excellent strength and dimensional stability. Such transparent polyester sheets are well known, widely used and typically prepared from high molecular weight polyesters prepared by condensing a dihydric alcohol with a dibasic saturated fatty acid or derivative thereof.

Suitable dihydric alcohols for use in preparing such polyesters are well known in the art and include any glycol wherein the hydroxyl groups are on the terminal carbon atom and contain from two to twelve carbon atoms such as, for example, ethylene glycol, propylene glycol, trimethylene glycol, hexamethylene glycol, decamethylene glycol, dodecamethylene glycol, 1,4-cyclohexane, dimethanol, and the like.

Suitable dibasic acids useful for the preparation of polyesters include those containing from two to sixteen carbon atoms such as adipic acid, sebacic acid, isophthalic acid, terephtalic acid and the like. Alkyl esters of acids such as those listed above can also be employed. Other alcohols and acids as well as polyesters prepared therefrom and the preparation of the polyesters are described in U.S. Pat. Nos. 2,720,503 and 2,901,466. Polyethylene terephthalate is preferred.

Polyester support thickness can range from about 15 millinewtons to 100 millinewtons. The preferred stiffness is between 20 and 100 millinewtons. Polyester stiffness less than 15 millinewtons does not provide the required stiffness for display materials in that they will be difficult to handle and do not lay flat for optimum viewing. Polyester stiffness greater than 100 millinewtons begins to exceed the stiffness limit for processing equipment and has no performance benefit for the display materials.

Generally polyester films supports are prepared by melt extruding the polyester through a slit die, quenching to the amorphous state, orienting by machine and cross direction stretching and heat setting under dimensional restraint. The polyester film can also be subjected to a heat relaxation treatment to improve dimensional stability and surface smoothness.

The polyester film will typically contain an undercoat or primer layer on both sides of the polyester film. Subbing layers used to promote adhesion of coating compositions to the support are well known in the art and any such material can be employed. Some useful compositions for this purpose include interpolymers of vinylidene chloride such as vinylidene chloride/methyl acrylate/itaconic acid terpolymers or vinylidene chloride/acrylonitrile/acrylic acid terpolymers, and the like. These and other suitable compositions are described, for example, in U.S. Pat. Nos. 2,627,088; 2,698,240; 2,943,937; 3,143,421; 3,201,249; 3,271,178; 3,443,950; 3,501,301. The polymeric subbing layer is usually overcoated with a second subbing layer comprised of gelatin, typically referred to as gel sub. In a preferred embodiment a photographic member comprising at least one photosensitive layer and an integral base material comprising at least one polyester layer and an upper surface layer comprising a polyester or polyolefin polymer and a bluing tint wherein said integral base material has a spectral transmission of greater than 90% further comprises at least one subbing layer. In another embodiment of said photographic member the integral base member comprises a bottom layer of polyethylene. In this case there is no need for a subbing layer to provide the necessary adhesion to the support.

A transparent polymer base free of $TiO_2$ is preferred because the $TiO_2$ in the transparent polymer reduces the % transmission of the photographic element and gives the clear display materials an undesirable opalescence appearance. The $TiO_2$ also gives the transparent polymer support a slight yellow tint, which is undesirable for a photographic clear display material.

As used herein, the phrase "photographic element" is a material that utilizes photosensitive silver halide in the formation of images. The photographic elements can be black and white, single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

For the preferred clear display material of this invention, a photographic member comprising at least one photosensitive layer and an integral base material comprising at least one polyester layer and an upper surface layer comprising a polyester or polyolefin polymer and a bluing tint wherein said integral base material has a spectral transmission of greater than 90%. Said photographic imaging member comprises an integral base material that is oriented wherein said upper polymer layer comprises at least one polyethylene layer. Polyethylene is preferred because it is low in cost and also provides good adhesion to the photosensitive layers. In another embodiment, the photographic member comprising at least one photosensitive layer and an integral base material comprising at least one polyester layer and an upper surface layer comprising a polyester or polyolefin polymer and a bluing tint wherein said integral base material has a spectral transmission of greater than 90% and further comprises at least one gel subbing layer. In some case it is preferred to have said photographic member with the upper most layer comprising polyester. In this member, the polyester surface would be primed and gel subbed to promote adhesion to the photosensitive layer. Polyester offers enhanced gloss and optical transmission and could provide an imaging base member with one layer.

The photographic member of a preferred embodiment comprises at least one photosensitive layer on each the top and bottom of said member.

Furthermore said photosensitive layer comprises silver halide and a dye forming coupler on the top of the photographic imaging member. Another embodiment provides a photographic imaging member comprises at least one photosensitive layer and an integral base material comprising at least one polyester layer and an upper surface layer comprising a polyester or polyolefin polymer and a bluing tint wherein said integral base material has a spectral transmission of greater than 90% wherein the bottom layer of said member comprises a photosensitive silver halide layer and a dye forming coupler. Applying the imaging layer to either the top or bottom is suitable for a photographic clear display material, however it is not sufficient to create a photographic clear material that is optimum and has reduced developer time. For the display material of this invention, at least one image layer comprises at least one dye forming layer on each of the top and bottom of the imaging support of this invention is most preferred. Applying an image layer to both the top and bottom of the support allows for optimization of image dye density while allowing for developer time less than 50 seconds. In an additional embodiment the photographic imaging element comprises at least one photosensitive layer on each the top and bottom of said member further comprises a bottom subbing layer. Such a member provides flexibility in the manufacturing process to provide surfaces that are either an integral part of the coextruded structure or being able to apply a subbing layer to get the desired adhesion when there is either a photosensitive layer on the backside or if there is need for antistatic layer to prevent static. In a preferred embodiment the photographic imaging member comprises at least one photosensitive layer and an integral base material comprising at least one polyester layer and an upper surface layer comprising a polyester or polyolefin polymer and a bluing tint wherein said integral base material has a spectral transmission of greater than 90% wherein at least one layer below said polyethylene containing layer comprises a charge control agent having an electrical resistivity of less than $10^{11}$ ohms per square.

The display material of this invention wherein said at least one dye forming layer on the opposite side of said transparent polymer sheet from the biaxially oriented thin polymer layer has less dye forming coupler than the imaging layer on the same side as the biaxially oriented thin polymer layer is suitable. It has been found that the duplitized emulsion top side to bottom side coverage ratio should be in a range of 1:0.6 to 1:1.25. It has been shown that the duplitized emulsion top side to bottom side coverage ratio of 1:1.25 resulted in significant and adverse attenuation of the imaging light which resulted in under exposure of the bottom side emulsion coating. Conversely, a duplitized emulsion top side to bottom side coverage ratio of less than 1:0.6 resulted in significant and adverse attenuation of the imaging light which resulted in over exposure of the top side emulsion coating. The clear display material of this invention wherein at least one dye forming layer on the backside side comprises about the same amount of dye forming coupler of the imaging layer on the top side is most preferred. Coating substantially the same amount of light sensitive silver halide emulsion on both sides has the additional benefit of balancing the imaging element for image curl caused by the contraction and expansion of the hydroscopic gel typically found in photographic emulsions. In an additional embodiment in which there is one photosensitive layer on said photographic imaging member comprising at least one photosensitive layer and an integral base material comprising at least one polyester layer and an upper surface layer comprising a polyester or polyolefin polymer and a bluing tint wherein said integral base material has a spectral transmission of greater than 90% further comprises an antihalation layer. The antihalation layer when coated on the side opposite to the photosensitive layer provides improved sharpness to the image. During processing the antihalation layer is removed and a clear transmission image with excellent sharpness is achieved.

Prior art clear display materials are generally coated on one side and because of the high dye density requirement, generally have a heavy emulsion coverage. This heavy emulsion coverage results in an increase in developer time as the image processing chemistry needs additional time to develop the imaging layers. For the clear duplitized display materials of this invention, since the emulsion coverage is split between the top side and the bottom side, the developer time has been found to be less than 50 seconds increasing the efficiency of the processing equipment.

As used herein, the phrase "photographic element" or "imaging element" is a material that utilizes photosensitive silver halide in the formation of images. The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

For the display material of this invention, at least one image layer containing silver halide and a dye forming coupler located on the top side or bottom side of said imaging element is preferred. Applying the imaging layer to either the top or bottom is preferred for a quality photographic transmission display material. For some markets improved image quality requires an increase in dye density. Increasing dye density increases the amount of light sensitive silver halide emulsion coated on one side. While the increase in emulsion coverage does improve image quality, developer time is increased from 50 seconds to 110 seconds. For the display material of this invention it is preferred that at least one image layer comprising at least one dye forming coupler is located on both the top and bottom of the imaging support of this invention is preferred. Applying an image layer to both the top and bottom of the support allows for optimization of image density with thinner photosensitive layers while allowing for developer time less than 50 seconds.

The display material of this invention wherein at least one dye forming layer on the top side comprises about the same amount of dye forming coupler of the imaging layer on the backside is most preferred. Coating substantially the same amount of light sensitive silver halide emulsion on both sides has the additional benefit of balancing the imaging element for image curl caused by the contraction and expansion of the hydroscopic gel typically utilized in photographic emulsions.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating, and extrusion coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in *The Theory of the Photographic Process,* Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylaminoborane, stannous chloride, hydrazine, high pH (pH 8–11), and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements of this invention may use emulsions doped with Group VIII metals such as iridium, rhodium, osmium, and iron as described in *Research Disclosure,* September 1994, Item 36544, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black-and-white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 mm.

The elements of the invention may use materials as disclosed in Research Disclosure, 40145, September 1997, particularly the couplers as disclosed in Section II of the Research Disclosure.

In the following Table, reference will be made to (1) Research Disclosure, December 1978, Item 17643, (2) Research Disclosure, December 1989, Item 308119, and (3) Research Disclosure, September 1994, Item 36544, all published by Kenneth Mason Publications, Ltd., Dudley Annex, 12a North Street, Emsworth, Hampshire PO10 7DQ, ENGLAND. Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
| --- | --- | --- |
| 1 | I, II | Grain composition, |
| 2 | I, II, IX, X, XI, XII, XIV, XV | morphology and preparation. Emulsion preparation |
| 3 | I, II, III, IX A & B | including hardeners, coating aids, addenda, etc. |
| 1 | III, IV | Chemical sensitization and |
| 2 | IIV, IV | spectral sensitization/ |
| 3 | IV, V | desensitization |
| 1 | V | UV dyes, optical brighteners, |
| 2 | V | luminescent dyes |
| 3 | VI | |
| 1 | VI | |
| 2 | VI | Antifoggants and stabilizers |
| 3 | VII | |
| 1 | VIII | Absorbing and scattering |
| 2 | VIII, XIII, XVI | materials; Antistatic layers; |
| 3 | VIII, IX C & D | matting agents |
| 1 | VII | Image-couplers and image- |
| 2 | VII | modifying couplers; Dye |
| 3 | X | stabilizers and hue modifiers |
| 1 | XVII | |
| 2 | XVII | Supports |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | Chemical processing; |
| 2 | XIX, XX, XXII | Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum, as well as with electron beam, beta radiation, gamma radiation, X ray, alpha particle, neutron radiation, and other forms of corpuscular and wave-like radiant energy in either noncoherent (random phase) forms or coherent (in phase) forms, as produced by lasers. When the photographic elements are intended to be exposed by X rays, they can include features found in conventional radiographic elements.

The imaging elements of this invention are preferably exposed by means of a collimated beam, to form a latent image, and then processed to form a visible image, preferably by other than heat treatment. A collimated beam is preferred, as it allows for digital printing and simultaneous exposure of the imaging layer on the top and bottom side without significant internal light scatter. A preferred example of a collimated beam is a laser also known as light amplification by stimulated emission of radiation. The laser is preferred because this technology is used widely in a number of digital printing equipment types. Further, the laser provides sufficient energy to simultaneously expose the light sensitive silver halide coating on the top and bottom side of the display material of this invention without undesirable light scatter. Subsequent processing of the latent image into a visible image is preferably carried out in the known RA-4™ (Eastman Kodak Company) Process or other processing systems suitable for developing high chloride emulsions.

The following examples illustrate the practice of this invention. They are not intended to be exhaustive of all possible variations of the invention. Parts and percentages are by weight unless otherwise indicated.

EXAMPLES

Example 1

In this example the invention was compared to a prior art clear display material. The invention was a duplitized support containing a biaxially oriented sheet of transparent polyester base with a thin skin layer of clear ethylene polymer further comprising blue tint and optical brightener. The prior art material and the invention were measured for % transmission, lightness, color and stiffness. This example will show a reduction in the yellowness of a density minimum area and reduction in developer time.

The following photographic clear display material was used as a comparison for the invention:

Kodak DuraClear (Eastman Kodak Co.), is a one side color silver halide coated polyester support that is 180 $\mu$m thick. The support is a clear gel subbed polyester.

The following coextruded biaxially oriented photographic clear display material was prepared by extrusion casting and then orienting in the machine direction and then orienting in the cross direction a two layer sheet of polymer.

Top Layer (Top Emulsion Side)

A 50/50 blend of low density polyethylene (Eastman 4002P) and Dupont Bynel were previous compounded with a blue tint and optical brightener and then formed integrally with a bottom layer of polyester by coextrusion and melt casting onto a chill roller and then biaxially orienting. Said top layer was 0.75 μm thick. 0.05% Pigment blue 60 was added to polyethylene layer. Bottom Layer:

The bottom layer was a clear polyethylene terephthalate base that was approximately 175 μm thick. The bottom most side of this layer was subbed and gel coated to promote adhesion to the backside emulsion layer.

The structure of the duplitized invention in this example was as follows:

Coating format 1
Polyethylene/Bynel Blend with blue tints and optical brightener
Polyethylene terephthalate
Sub primer
Gelatin sub coating
Coating format 1

Coating format 1 was utilized to prepare the transmission display material of the invention and was coated on the polyethylene skin layer which was corona discharge treated at 30 joules/m².

|  | Coating Format 1 | Laydown mg/m² |
|---|---|---|
| Layer 1 | Blue Sensitive Layer | 1300 |
|  | Gelatin | 1300 |
|  | Blue sensitive silver | 200 |
|  | Y-1 | 440 |
|  | ST-1 | 440 |
|  | S-1 | 190 |
| Layer 2 | Interlayer |  |
|  | Gelatin | 650 |
|  | SC-1 | 55 |
|  | S-1 | 160 |
| Layer 3 | Green Sensitive |  |
|  | Gelatin | 1100 |
|  | Green sensitive silver | 70 |
|  | M-1 | 270 |
|  | S-1 | 75 |
|  | S-2 | 32 |
|  | ST-2 | 20 |
|  | ST-3 | 165 |
|  | ST-4 | 530 |
| Layer 4 | UV Interlayer |  |
|  | Gelatin | 635 |
|  | UV-1 | 30 |
|  | UV-2 | 160 |
|  | SC-1 | 50 |
|  | S-3 | 30 |
|  | S-1 | 30 |
| Layer 5 | Red Sensitive Layer |  |
|  | Gelatin | 1200 |
|  | Red sensitive silver | 170 |
|  | C-1 | 365 |
|  | S-1 | 360 |
|  | UV-2 | 235 |
|  | S-4 | 30 |
|  | SC-1 | 3 |
| Layer 6 | UV Overcoat |  |
|  | Gelatin | 440 |
|  | UV-1 | 20 |
|  | UV-2 | 110 |
|  | SC-1 | 30 |
|  | S-3 | 20 |
|  | S-1 | 20 |
| Layer 7 | SOC |  |
|  | Gelatin | 490 |
|  | SC-1 | 17 |
|  | SiO₂ | 200 |
|  | Surfactant | 2 |

APPENDIX

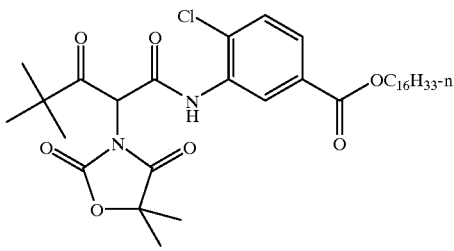

Y-1

ST-1=N-tert-butylacryalaminde/n-butyl acrylate copolymer (50:50)

S-1=dibutyl phthalate

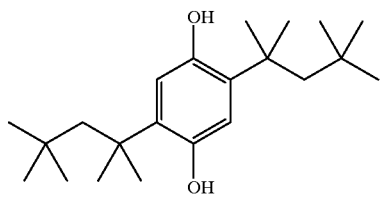

SC-1

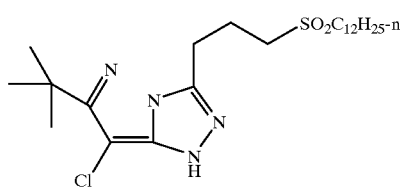

M-1

S-2=diundecyl phthalate

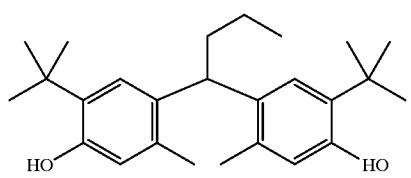

ST-2

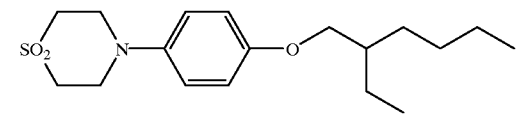

ST-3

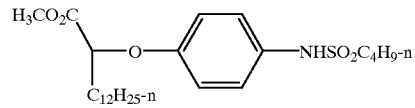

ST-4

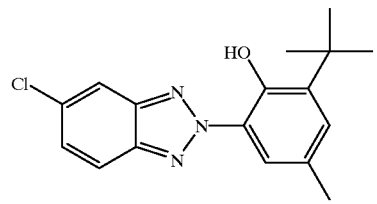

UV-1

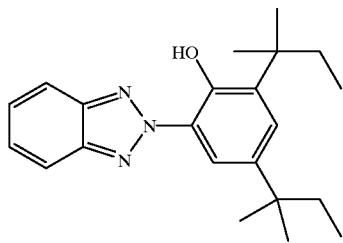

S-3=1,4-Cyclohexyldimethylene bis(2-ethylhexanoate)

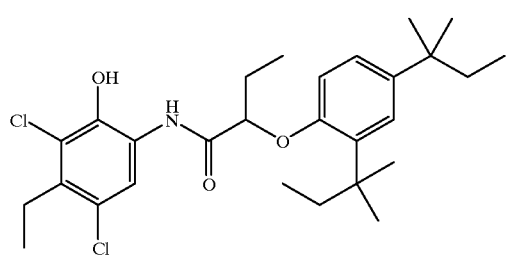

S-4=2-(2-Butoxyethoxy)ethyl acetate

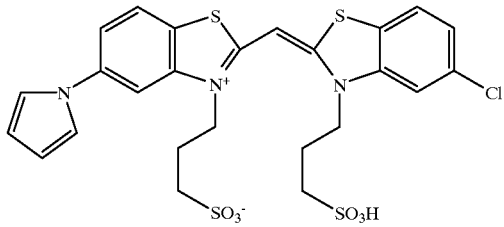

Dye 1

The display material was processed as a minimum density. The display supports were measured for status A density using an X-Rite Model 310 photographic densitometer. Spectral transmission is calculated from the Status A density readings and is the ratio of the transmitted power to the incident power and is expressed as percentage as follows; $T_{RGB}=10^{-D}*100$ where D is the average of the red, green and blue Status A transmission density response. The display material were also measured for L*, a* and b* using a Spectrogard spectrophotometer, CIE system, using illuminant D6500. The comparison data for invention and control are listed in Table 2 below.

TABLE 2

| Measure | Invention | Control |
| --- | --- | --- |
| % Transmission | 97% | 90% |
| CIE D6500 L* | 95.81 | 94.34 |
| CIE D6500 a* | −0.47 | −0.79 |
| CIE D6500 b* | 0.82 | 4.08 |

The photographic clear display support coated on the top and bottom sides with the light sensitive silver halide coating format of this example exhibits all the properties needed for an photographic clear display material. Further the photographic clear display material of this example has many advantages over prior art photographic display materials. The biaxially oriented polyethylene skin layer has blue colorants adjusted to provide an improved minimum density position compared to prior art clear transmission display materials as the invention was able to overcome the native yellowness of the processed emulsion layers (b* for the invention was 0.82 compared to a b* of 4.08 for prior art transmission materials The 97% transmission for the invention compared to a percent transmission for the control of 90.3% provides an significantly improved transmission image. Further, concentration of the tint materials in the biaxially oriented sheet allows for improved manufacturing efficiency and lower material utilization resulting in a lower cost display material. The a* and L* for the invention are consistent with a high quality transmission display materials.

Surprisingly, when images were printed on the invention by laser exposure by exposing the top side only, no distortion in the backside image was observed. Finally, the invention had a developer time of 45 seconds compared to a developer time of 110 seconds for prior art transmission display materials. A 45 second developer time has significant commercial value in that this the display material of this invention can significantly increase the productivity of processing equipment which tends to be expensive.

The invention has been described in detail with particular reference to preferred embodiments thereof, but it will be understood that variations and modifications can be effected within the spirit and scope of the invention.

What is claimed is:

1. A photographic member comprising at least one photosensitive layer and an integral base material comprising at least one polyester layer and an upper surface layer comprising a polyester polymer and a bluing tint wherein said integral base material has a spectral transmission of greater than 90%.

2. The photographic imaging member of claim 1 wherein said integral base material is oriented.

3. The photographic imaging member of claim 1 wherein said member further comprises at least one subbing layer.

4. The photographic imaging member of claim 1 wherein said member comprises at least one photosensitive layer on each of the top and bottom of said member.

5. The photographic imaging member of claim 1 wherein said imaging member has a thickness of between 76 and 256 μm.

6. The photographic imaging member of claim 1 wherein said integral base material comprised optical brighteners.

7. The photographic imaging member of claim 1 wherein said integral base material is substantially free of $TiO_2$ inorganic pigments.

8. The photographic imaging member of claim 1 wherein photographic imaging member further comprises an antihalation layer.

9. The photographic imaging member of claim 1 wherein the top layer comprises a photosensitive silver halide and a dye forming coupler.

10. The photographic imaging member of claim 1 wherein said photographic imaging member further comprises a bottom layer comprising a photosensitive silver halide layer and a dye forming coupler.

11. The photographic imaging member of claim 1 wherein at least one layer below said polyethylene containing layer comprises a charge control agent having an electrical resistivity of less than $10^{11}$ ohms per square.

12. The photographic imaging member of claim 1 wherein said integral base material comprises a bottom layer of polyethylene.

13. The photographic imaging member of claim 4 wherein said integral base material has a bottom subbing layer.

14. The photographic imaging member of claim 1 wherein said integral base material comprises a top integral polymer layer of polyester and a gel subbing layer is on top of said integral polymer layer of polyester.

15. A photographic member comprising at least one photosensitive layer and an integral base material comprising at least one polyester layer and an upper surface layer comprising a polyester and a bluing tint wherein said integral base material has a spectral transmission of greater than 90% wherein at least one layer below a polyethylene containing layer comprises a charge control agent having an electrical resistivity of less than $10^{11}$ ohms per square.

16. The photographic imaging member of claim 15 wherein said integral base material is oriented.

17. The photographic imaging member of claim 15 wherein said member further comprises at least one subbing layer.

18. The photographic imaging member of claim 15 wherein said member comprises at least one photosensitive layer on each of the top and bottom of said member.

19. The photographic imaging member of claim 15 wherein said imaging member has a thickness of between 76 and 256 $\mu$m.

20. The photographic imaging member of claim 15 wherein said integral base material comprises optical brighteners.

21. The photographic imaging member of claim 15 wherein said integral base material is substantially free of inorganic pigments.

22. The photographic imaging member of claim 15 wherein photographic imaging member further comprises an antihalation layer.

23. The photographic imaging member of claim 15 wherein the top layer comprises a photosensitive silver halide and a dye forming coupler.

24. The photographic imaging member of claim 15 wherein said photographic imaging member further comprises a bottom layer comprising a photosensitive silver halide layer and a dye forming coupler.

25. The photographic imaging member of claim 15 wherein said integral base material comprises a bottom layer of polyethylene.

26. The photographic imaging member of claim 18 wherein said integral base material has a bottom subbing layer.

27. The photographic imaging member of claim 15 wherein said integral base material comprises a top integral polymer layer of polyester and a gel subbing layer is on top of said integral polymer layer of polyester.

* * * * *